Patented Dec. 31, 1935

2,026,451

UNITED STATES PATENT OFFICE 2,026,451

PROCESS OF PRODUCING SOLUBLE, POURABLE, AND STABLE ALKALI SILICATE COMPOUNDS

Franz Albertshauser, Dusseldorf, Germany, assignor to firm Philadelphia Quartz Company, Philadelphia, Pa.

No Drawing. Application June 5, 1933, Serial No. 674,470. In Germany June 17, 1932

10 Claims. (Cl. 23—110)

The present invention relates to a process of producing soluble, pourable and stable alkali silicate compounds.

The known water glass melt products are practically insoluble in cold or hot water without application of pressure and the consumers are therefore usually compelled to use the solutions of water glass which are delivered from the manufacturers.

Crystallized, easily soluble compounds of the type of the meta silicates are known. These compounds are used for various purposes, for instance for the cleansing of articles of metal or other materials.

It has already been proposed to mix solutions of said meta silicates with solutions of water glass having a higher content of $SiO_2$ in order to obtain a product which has the high corrosion-protective power of commercial water glass and which simultaneously possesses the excellent purifying properties of the meta silicates. When adding water glass rich in silicic acid to the solutions of crystallized meta silicates in order to produce a corrosion-protective substance, usually the commercial water glass solutions have been used. This process may of course also be reversed by adding to the commercial water glass solutions caustic soda in such amounts that a product is obtained which corresponds to a mixed solution of meta silicate and water glass. In both cases, however, only solutions of water glass can be used and this circumstance of course involves very high transport costs.

Hydrated forms of the commercial, solid water glass are also known. These substances may for instance be produced by atomizing water glass solutions. Water glass of this kind, however, tends to absorb moisture and will therefore turn sticky and lumpy when being stored in the open for a short time. Hydrated commercial water glass therefore cannot be used as a constituent of dry mixtures of meta silicates and water glass. Meta silicates are stable, but the hydrated water glass would, even as a constituent of a mixture, absorb moisture and the mixture would, after a short time lose its pourable character and be converted into a sticky and lumpy mass. Products of this kind are of course of low commerical value.

The term "pourable character" is here used to denote that the substance, like fine dry sand and dry powder, may easily be poured from one receptacle into another in the form of an even, uniform stream and will readily accommodate itself to the form of the surrounding receptacle walls and settle in the form of a loose mass with even surface.

The object of the present invention is to avoid the above named drawbacks and to provide a relatively simple process of producing dry, pourable and easily water-soluble preparations, which may be stored for a very long time without altering their consistency and which contain alkali meta silicates as well as common water glass in amounts sufficient to protect against corrosion.

According to the invention soluble, pourable and stable alkali silicate compounds are produced by mixing partially crystallized melts of silicates of alkali metals with solid hydrated water glass in which the ratio between silicon dioxide and sodium oxide is higher than 1:1, allowing the mixture to solidify and comminuting the solidified product.

When carrying the invention into effect the starting material may, for instance, consist of technical water glass solutions to which such a degree of alkalinity has been imparted, by addition of caustic alkali at raised temperature, that they correspond to a meta silicate having a definite water content. The crystallization of these solutions may be caused by cooling. The water glass needed may be used in a hydrate form corresponding substantially to the composition: 18,5% of $Na_2O$, 62,25% of $SiO_2$ and 19,25% of water. The hydrated water glass is added to the solution of meta silicate after a substantial crystallization has taken place, but before the mass has solidified completely. The hydrate powder will then have no opportunity to dissolve in the melt and will be uniformly distributed in the crystal pap when the mixture is intensively stirred. During the continued cooling the mass will solidify and after the grinding or milling operation a finely granulated product is obtained, which may be stored for as long periods as the pure meta silicates. The pulverulent hydrated water glass is apparently so distributed in the large quantity of meta silicate, that it is fully enclosed by the same and protected against the influence of the humidity of the air.

If the water glass in the form of a powder is introduced into the hot meta silicate solution before the crystallization commences, the hydrated water glass will to a certain extent be dissolved in the alkaline meta silicate solution. In this case no thoroughly crystallized end product would be obtained. Experience has shown that well defined, dry and storable meta silicates can only be obtained when a definite relation between the alkali and the silicic acid is strictly maintained. When working in accordance with the present inventon, therefore, dsturbances of the crystallization process are avoided and the structure is not impaired.

It is also possible to start with finished meta silicates. These silicates are melted in their own crystal water and are thereupon treated in the manner described above.

Example 1

100 kg. of commercial water glass are stirred together with 76.5 kg. of soda lye of 38° Bé. and the mixture is thereupon vaporized until a weight of 125.1 kg. is obtained, whereupon the concentrated solution is cooled under stirring. After the crystallization has commenced the crystal pap is mixed with 20 kg. of solid hydrated water glass which has been produced by atomizing a water glass solution. The mixture is thereupon caused to solidify and the solid product is comminuted in usual manner. The end product is a dry, stable alkali silicate product, which very easily and completely dissolves in water and which is very well suited for storing.

Example 2

120 kg. of commercial water glass are stirred with 30 kg. of solid caustic soda until the latter substance has dissolved completely, whereupon the solution is cooled under stirring. When the crystallization has commenced 18 kg. of atomized water glass are introduced into the crystal pap under stirring, whereupon the mixture is caused to solidify. The end product has the properties described in Example 1.

Example 3

150 kg. of meta silicate of the formula $Na_2SiO_3.9H_2O$ are melted in their own crystal water, whereupon the melt is cooled under stirring. When a substantial crystallization has taken place 12 kg. of hydrated water glass are introduced under stirring and the mixture is thereupon caused to solidify. The end product has the properties described in Example 1.

Example 4

To 300 kg. of water glass (60° Bé.) 197 kg. of soda lye (39° Bé.) and 15 kg. of water are added, the mixture is heated under stirring and caused to solidify and to crystallize. Before the crystallization has finished 220 kg. of finely pulverized hydrated water glass are added under thorough stirring. When the mass has cooled and solidified it is comminuted. The end product is easily pourable and will easily dissolve in water.

Further modifications and variations may be resorted to within the spirit of the invention as here claimed.

I claim:—

1. A process of producing soluble, pourable and stable alkali silicate compounds, comprising the steps of adding to partially crystallized alkali meta silicate melts solid hydrated water glass in which the ratio between silicon dioxide and sodium oxide is higher than 1:1, causing the mixture to solidify and comminuting the solidified mass.

2. A process of producing soluble, pourable and stable alkali silicate compounds, comprising the steps of melting finished meta silicates in their own crystal water, causing the silicates to crystallize partially, adding solid hydrated water glass in which the ratio between silicon dioxide and sodium oxide is higher than 1:1, causing the mixture to solidify and comminuting the solidified mass.

3. A process of producing soluble, pourable and stable alkali silicate compounds, comprising the steps of adding caustic alkali to commercial water glass in amounts necessary to form meta silicates, causing partial crystallization of the meta silicates, adding solid hydrated water glass in which the ratio between silicon dioxide and sodium oxide is greater than 1:1, causing the mixture to solidify and comminuting the solidified mass.

4. A process of producing soluble, pourable and stable alkali silicate compounds which comprises the steps of adding caustic alkali to commercial water glass in amounts necessary to form metasilicate, causing partial crystallization of the metasilicate, adding solid hydrated water glass which contains more silicon dioxide relative to sodium oxide than the metasilicate, causing the mixture to solidify and comminuting the solidified mass.

5. A process of producing silicate compounds, comprising the step of adding amorphous hydrated water glass to alkali meta silicate solutions in which crystallization has been at least partially completed.

6. A process of producing silicate compounds, comprising the steps of melting crystallized meta silicates in their own water of crystallization, effecting partial crystallization of the silicates, adding amorphous hydrated water glass to the silicates, and then effecting solidification of the mixture.

7. A process of producing silicate compounds, comprising the steps of adding amorphous hydrated water glass to at least partially crystallized alkali meta silicate melts, and then effecting solidification of the mixture.

8. A process of producing silicate compounds, comprising the steps of adding amorphous hydrated water glass to at least partially crystallized alkali meta silicate melts, and then effecting solidification of the mixture before the solid hydrated water glass dissolves in the uncrystallized parts of said meta silicate melt.

9. As a new article of manufacture, a solid, pourable, alkali silicate mixture, said mixture comprising a crystalline soluble alkali silicate and an amorphous alkali silicate in which the ratio of silica relative to alkali is greater than in the crystalline silicate, said amorphous silicate being interspersed with, and protected from the atmosphere by said crystalline silicate.

10. As a new article of manufacture, a mixture of amorphous and crystalline alkali silicates, said amorphous silicates being intimately interspersed with, and enclosed in said crystalline silicates.

FRANZ ALBERTSHAUSER.